(12) United States Patent
Jain (10) Patent No.: US 9,477,723 B2
(45) Date of Patent: Oct. 25, 2016

(54) CAUSAL PROFILE

(71) Applicant: Lakshya Jain, Los Altos, CA (US)

(72) Inventor: Lakshya Jain, Los Altos, CA (US)

(*) Notice: Subject to any disclaimer, the term of this patent is extended or adjusted under 35 U.S.C. 154(b) by 257 days.

(21) Appl. No.: 13/943,591

(22) Filed: Jul. 16, 2013

(65) Prior Publication Data
US 2013/0297593 A1    Nov. 7, 2013

(51) Int. Cl.
*G06F 7/00* (2006.01)
*G06F 17/30* (2006.01)
*G06Q 50/00* (2012.01)

(52) U.S. Cl.
CPC ... *G06F 17/30554* (2013.01); *G06F 17/30696* (2013.01); *G06F 17/30699* (2013.01); *G06F 17/30702* (2013.01); *G06F 17/30705* (2013.01); *G06F 17/30867* (2013.01); *G06Q 50/01* (2013.01)

(58) Field of Classification Search
CPC ............. G06F 17/30699; G06F 17/30705
See application file for complete search history.

(56) References Cited

U.S. PATENT DOCUMENTS

| 6,629,097 | B1* | 9/2003 | Keith |
|---|---|---|---|
| 2006/0224938 | A1* | 10/2006 | Fikes et al. ................. 715/500 |
| 2007/0122787 | A1* | 5/2007 | Pembleton et al. .......... 434/322 |
| 2012/0150960 | A1 | 6/2012 | Nalawade |

FOREIGN PATENT DOCUMENTS

WO    2012/155144 A1    11/2012

OTHER PUBLICATIONS

Charles Hutton, document tittle "Philosophical and Mathematical dictionary" (https://books.google.com/books?id=Zk7mAAAAMAAJ) Oct. 2009.*

* cited by examiner

*Primary Examiner* — Loan T Nguyen
(74) *Attorney, Agent, or Firm* — Maschoff Brennan (57) ABSTRACT

According to an aspect of an embodiment, a method of graphically representing a history of a user includes receiving information indicating a history of a user with respect to multiple categories. The method also includes mapping received information within a corresponding category and pertaining to a correspond age range to a corresponding indicator such that the received information is mapped to multiple indicators, each indicator being associated with a corresponding category and a corresponding age range. The method also includes generating a profile object based on the indictors. The profile object graphically represents the history of the user with respect to the categories.

20 Claims, 8 Drawing Sheets

Legend
500B - Profile Object
513-516 – Two-Dimensional Objects

Legend
500C - Profile Object
517-520 – Three-Dimensional Objects

CAUSAL PROFILE

FIELD

The embodiments discussed herein are generally related to social networking More particularly, examples embodiments relate to a causal profile representing a history of a user and searching for users with common or shared histories based on their causal profiles.

BACKGROUND

Social networks facilitate the making of connections by users with friends, family, classmates, customers, clients, and/or content of interest. A criterion commonly used for recommending connections and/or content of interest to users includes current interests of the users. Facebook is an example of a social network that uses current interests as a matching criterion. For instance, Facebook lists friends with common interests and regularly invites users to like pages based on the amount of interest from the users' friends on the pages. However, these invitations/recommendations are based off of current interests, ignoring a significant force behind the person's life and current interests, e.g., their past. A person's past shapes the person and molds the person's character. The past of a person may be much more influential than their present in determining their character. Unfortunately, the social networking sites of today seem to ignore this very important element of one's personality, focusing instead on the present and the now.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of graphically representing a history of a user includes receiving information indicating a history of a user with respect to multiple categories. The method also includes mapping received information within a corresponding category and pertaining to a corresponding age range to a corresponding indicator such that the received information is mapped to multiple indicators, each indicator being associated with a corresponding category and a corresponding age range. The method also includes generating a profile object based on the indicators. The profile object graphically represents the history of the user with respect to the categories.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present invention will be explained with reference to the accompanying drawings.

Figure 1:
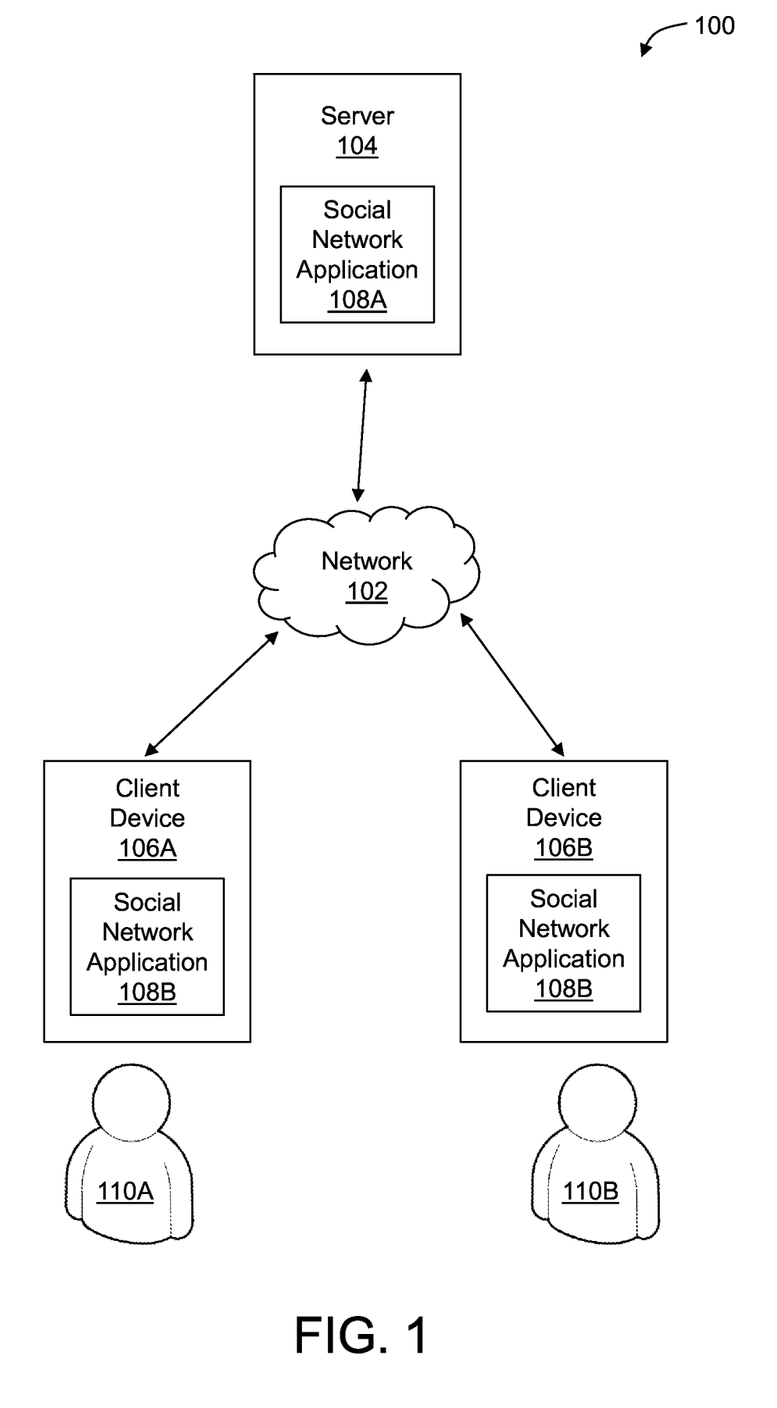
FIG. 1 illustrates an example operating environment 100 in which some embodiments described herein may be implemented.

FIG. 1 illustrates an example operating environment 100 in which some embodiments described herein may be implemented. The operating environment 100 includes a network 102, a server 104, and client devices 106A, 106B (generically "client device 106" or "client devices 106"). A social network application including one or more components 108A, 108B (hereinafter "social network application 108") may be provided and executed on the server 104 and/or the client devices 106. The social network application 108 may allow users 110A, 110B (generically "user 110" or "users 110") to interact with an online social network in which, e.g., the users 110 make connections with friends, family, classmates, customers, clients, etc. for social purposes, business purposes, and/or other purposes. The users 110 may be represented as nodes in the social network, for example. The social network application 108 may show associations between users and/or may facilitate the acquisition of new contacts. Examples of social networks include Facebook, LinkedIn, Classmates.com, Yelp, Twitter, and the like.

In general, the network 102 may communicatively couple the server 104 and the client devices 106 together. Accordingly, the network 102 may include one or more wide area networks (WANs) and/or local area networks (LANs). In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

Each of the client devices 106 may include, but is not limited to, a desktop computer, a laptop computer, a personal digital assistant (PDA), a smartphone, a tablet computer, or the like or any combination thereof. In general, each of the client devices 106 may be configured to communicate with the server 104 and/or other client devices 106 via the network 102.

In the illustrated embodiment, each of the client devices 106 is associated with a corresponding one of the users 110; for instance, the client device 106A is associated with the user 110A; and the client device 106B is associated with the user 110B. Although the client devices 106 have each been described as being associated with a particular one of the users 110, any one or more of the client devices 106 may alternately or additionally be associated with other users or more than one user or the like. Alternately or additionally, one or more of the users 110 may be associated with multiple client devices 106.

In the discussion that follows, the users 110 may be described as performing certain actions that may involve interacting with each other and/or with the server 104. Where not already explicitly stated, it is to be understood that the respective client devices 106 may be operated by the users 110 to accomplish the recited actions.

According to some embodiments described herein, the past may be more influential than the present in shaping an individual's personality, such as the personalities of the users 110. Accordingly, some embodiments described herein allow for unique interactions of users 110 based on their past rather than or in addition to their present.

For example, when one of the users 110 joins a social network and/or any time after joining the social network, the user 110 may answer a questionnaire or more generally may provide information relating to an evolution, past, or history of the user 110 over time, which information may be received by the social network application 108. The information may be categorized into multiple different particular categories. Politics is an example of a category. The information provided by the user 110 indicating the evolution of the user 110 over time with respect to politics may relate to political philosophies of the user 110 and/or political parties (e.g., Republican, Democrat, Libertarian) with which the user 110 identifies during each of multiple different age ranges of the life of the user 110. Alternately, the information with respect to politics may include politically-related events identified by the user 110 as influential to the user 110.

Outlook is another example of a category; the outlook of the user 110 during any given age range may be, for instance, optimistic, pessimistic, level-headed, realistic, or the like and/or may change from one age range to the next. Finances is another example of a category, the finances of the user may be described as, for example, debt free, in debt, debt free but cautious, wealthy, or the like.

Other examples of categories include, but are not limited to, food, physical health, family life, social life/friends, sports, global events and trends, education, entertainment, work/aspirations. In some embodiments, the categories may be divided into groups as internally-based categories (e.g., food, health, family life, social life/friends, outlook, finances) and externally-based categories (e.g., sports, global events and trends, politics, education, entertainment, work/aspirations). The foregoing categories are provided by way of example only and should not be construed to limit the disclosed embodiments. Other examples of categories may include religion, hobbies, mishaps, life-changing events, or the like.

The questionnaire may generally ask users about their past interests and influential events. For example, the user may be asked what their favorite activities were when they were young (or during one or more different age ranges), who their favorite entertainer was, what social problems or issues they may have had, what their political stance was, what influential personal and public events occurred which may have shaped their lives, or the like or any combination thereof. The user may answer the questionnaire for each age range of their life to gather sufficient information to map the information within each category and for each range to a corresponding indicator.

More generally, the information provided by the user 110 and received by the social network application 108 may relate to any of multiple categories and is not limited to the particular categories set forth above. In addition, the information may generally represent, during each of the age ranges, preferences of the user 110 within at least one of the categories, interests of the user within at least one of the categories, and/or influential events within at least one of the categories.

Examples of different age ranges, in years, may include 8-12, 13-19, 20-29, 30-45, 46-60, 61-74, and 75+. Each of the different age ranges may correspond to different stages of life arbitrarily defined herein as a formative stage (8-13), a juvenile stage (13-19), an early adulthood stage (20-29), a midlife stage (30-45), a post midlife stage (46-60), a retirement stage (61-74), and a golden years stage (75+). Of course, the foregoing age ranges are provided by way of example only and different age ranges may alternately or additionally be used consistent with the embodiments described herein.

The social network application 108 may map received information within a corresponding category and pertaining to a corresponding age range of the user 110 to a corresponding indicator such that the received information is mapped to multiple indicators, each indicator being associated with a corresponding category and a corresponding age range. Examples of different indicators include colors, fill patterns, textures, words, symbols, or the like or any combination thereof.

In some embodiments, the information may be mapped to two or more indicators for each category and age range to provide more nuance. For instance, in the category of entertainment, colors may be used as indicators to indicate a type of entertainment (e.g., movies, music, stage performances) preferred by the user, while fill patterns may be used as indicators to indicate, within the preferred type of entertainment, a preferred genre (e.g., horror, comedy, drama, action, hard rock, heavy metal, blues, R&B, pop, etc.). Alternately or additionally, the information may be mapped to three or more indicators for even more nuance.

The social network application 108 may generate a profile object for the user 110 based on the indicators. In general, the profile object may graphically illustrate the evolution of the user 110 over time (e.g., the user's past or history) with respect to the categories. For example, each of N categories may be represented by a different block segment of a three-dimensional shape including N block segments. The indicators associated with different age ranges of the user 110 and a given category may be included somewhere on the corresponding block segment of the three-dimensional shape. For example, if the user 110 is 18 years old, the user 110 may only have lived in two of the age ranges provided in the example above such that two indicators may be included somewhere on each of the N block segments of the three-dimensional shape.

In some embodiments, the same indicator may be used across different categories/corresponding block segments to mean different things. As a simplistic example, if the indicators include colors, red may be included in a block segment corresponding to a category of politics to indicate that the user 110 identifies Republican, while the same color of red may be included in a block segment corresponding to a category of food to indicate that the user 110 likes spicy food. Alternately, some or all of the indicators used may be unique across different categories/corresponding block segments.

Returning to FIG. 1, the profile object generated for the user 110 by the social network application 108 may be displayed on the corresponding client device 106. Alternately or additionally, the user 110 may choose to make the profile object visible as part of a profile of the user 110 within the social network that is visible to at least some other users in the social network. Alternately or additionally, the user 110 may browse profile objects included in profiles (public profiles, private profiles, or the like) of other users 110 and can compare the profile object of the user 110 to the profile objects of other users 110 to determine whether they share a similar or common past with respect to at least one of the categories. Alternately or additionally, the social network application 108 may provide a search function that allows the user 110 to run searches on the profile objects of other users 110 to find users with similar or common pasts with respect to at least one of the categories.

Modifications, additions, or omissions may be made to FIG. 1 without departing from the scope of the claimed embodiments. For example, the operating environment 100 may include more than two client devices 106 and/or users 110. Alternately or additionally, while the social network application 108 is illustrated as being bifurcated between the component 108A on the server 104 and the component 108B on the client devices 106, the social network application 108 may instead be provided exclusively on one or the other of the server 104 or the client devices 106. For example, the social network application 108 may be provided in its entirety on the server 104 and the client devices 106 may merely execute a web browser or other application to interact over the network 102 with the social network application 108 executing on the server 104.

Figure 2:
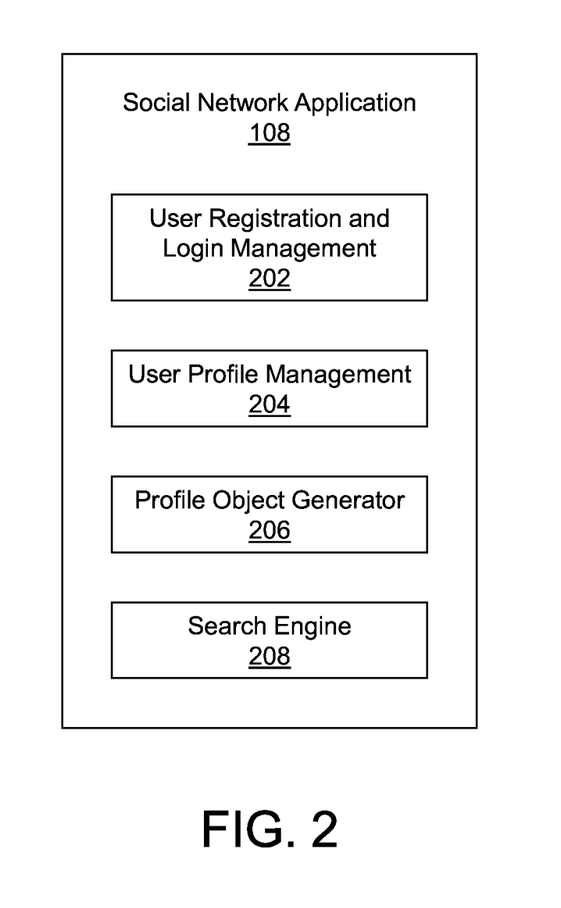
FIG. 2 is a block diagram of an example of a social network application that may be implemented in the operating environment of FIG. 1.

FIG. 2 is a block diagram of an example of the social network application 108 of FIG. 1, arranged in accordance with at least some embodiments described herein. In the illustrated embodiment, the social network application 108 includes various modules or components 202, 204, 206, 208 that may all be provided on one or the other of the server 104 or the client devices 106 or, and as illustrated in FIG. 1, that may be distributed with some components on the server 104 and some components on the client devices 106.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of a computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated.

Returning to FIG. 2, the various modules 202, 204, 206, 208 include a user registration and login management module 202, a user profile management module 204, a profile object generator 206, and a search engine 208. Each will be described in turn.

The user registration and login management module 202 enables a user, such as the user 110 of FIG. 1, of a social network to register to become a member of the social network and/or to login to the social network. To the extent a user is a registered member, the terms "user" and "member" may be used interchangeably herein. Login management can entail the use of known or convenient techniques to ensure that a member is who they say they are, that communications between the member and a server are secure, or the like. In a specific implementation, a member can login to a website associated with the social network. In an example implementation, the user registration and login management module 202 accepts or generates a user id, first and last name, email address, or the like. Typically, a user must accept an end user license agreement (EULA) or disclaimer by checking a checkbox. Alternately or additionally, a user can register using existing credentials, typically by entering a user id for that social network and a password.

It is sometimes useful to gather more information from the user than will necessarily be shared. For example, a member's gender, birthday, and profile picture might be useful information in personal contexts. A member's education, current employer, past employers, recommendations, and personal website might be useful in professional contexts. Contact information and/or other information can be kept private or made public.

The user profile management module 204 enables a member to set preferences, provide personal data, or otherwise customize an account in association with membership in (or connection to) the social network. Profile setup can include facilitating entry of, for example, a username, user contact, email, telephone, picture, other attributes (e.g., age, gender, ethnicity, height, interests, expertise, etc.), online network site IDs/links, or the like. In a specific implementation, profile setup includes administering a questionnaire to the user to collect, from the user, information relating to an evolution of the user over time, e.g., the user's past with respect to multiple different categories, examples of which are provided above. The user profile management module 204 thus collects the information used to generate the profile objects that allow members to discover others that have similar pasts with respect to at least some categories.

The profile object generator 206 is generally configured to generate profile objects for users of the social network. Accordingly, the profile object generator 206 may map profile information received from the user, such as information collected by the user profile management module 204, and indicating the evolution of the user over time with respect to the categories to corresponding indicators. In particular, the profile object generator 206 maps received information within a corresponding category and pertaining to a corresponding age range to a corresponding indicator such that the received information is mapped to multiple indicators, each indicator being associated with a corresponding category and a corresponding age range. The profile object generator 206 may also generate the profile object based on the indicators.

The search engine 208 enables a user to discover other users who have a similar or common past as the user, at least with respect to at least one category. The search engine 208 may interface with the user through text fields, drop down menus, or other user interface (UI) elements that allow the user to, among potentially other things, identify a particular category(ies), age range(s), and/or indicator(s) of interest. In this manner, the user can specify particular aspects of the user's evolution or past that are relatively more important to the user when searching for other users that have a similar past. As previously indicated, the searching may be carried out on profile objects, which may be used herein to graphically represent the evolution, past, or history of users with respect to various categories.

Alternately or additionally, the search engine 208 may implement a non-graphic and/or mathematical approach to find causal matches or non-matches. For example, suppose that user A shares 3 aspects of his shape/preferences during a certain age range (the user chooses the age range and searches for it) with user B and 4 with user C. For example, user A and user B may have similar interests in sports, music, and food, while user A and C may have similar tastes in sports, food, religion, and politics. User A searches for potential matches based on the number of categories shared. Using a simple mathematical approach, the search engine 208 may calculate a match score of 3 for user B, indicating 3 categories shared with user A, while the search engine 208 may calculate a match score of 4 for user C, indicating a total of 4 categories shared with user A.

A more complicated mathematical approach may involve weighting different categories according to user preference. For example, suppose that user A weights the category of sports twice as much as a default, as he deems this to be extra important. However, he does not view the category of food as particularly important to him, so he chooses to weight it half as much as the default (the default weight of each category may be 1, or any other suitable default value). By this method, and modifying the previous example, user B's match score may be 3.5 (2 for sports, 1 for music, and 0.5 for food) in relation to user A and user C's match score may be 4.5 (2 for sports, 0.5 for food, 1 for religion, and 1 for politics) in relation to user A.

Alternately or additionally, the search engine 208 may implement a tiebreaker. For example, if user C and user B both have a common match score of 2 relative to user A for a certain age range, then the tiebreaker used can be the amount of age ranges in which the two users share a common interest with regards to a specific category. For example, suppose that user B's and user C's common match score relative to user A is 2, and they share interests with user A in sports and politics during the age range of 13-19. Further suppose that user B shares interests in sports and/or politics with user A during the age range of 20-29, whereas user C does not. User B may then be ranked higher than user C in the search results, as user B wins out according to the tiebreaker. Thus, the foregoing illustrates some example mathematical approaches for finding and ranking users as matches based on preference.

Alternately or additionally, the search engine 208 may implement a mathematical approach for finding and/or sorting non-matches in which the search engine 208 searches for users with completely different pasts, e.g., users with lower match scores instead of higher match scores. Such a search function may be desired by some users that prefer to interact with others that are completely different from them.

Alternately or additionally, a different tiebreaking method than the one already mentioned above can be used with subcategories. When 2 users are tied in a match score, the search engine 208 may consider the number of subcategories in which they share common interests. Some examples of subcategories are: the jobs one has held during a particular age range, a favorite tourist destination, a favorite sport, a favorite sports player, a favorite type of entertainment, a favorite genre of entertainment, a favorite entertainer, a favorite politician, and so forth. For example, suppose that user X searches for potential matches and the search engine 208 determines that user Y and user Z have identical match scores of 3.0. Both of these users share common interests in 3 categories with user X for a particular age range: sports, entertainment, and politics. Further suppose that user Z shares common interests in 2 subcategories with user X, such as the same favorite athlete and the same favorite music album. User Y, meanwhile, shares a common interest with user X in one subcategory. In these and other embodiments, user Z may be ranked slightly higher on the list of potential matches for user X due to the subcategory tiebreaker. According to some embodiments, each subcategory may have a default tiebreaker score of one, and the user may choose how to weight these subcategories accordingly (i.e. subcategories in the "sports" category may have a value of 2, while subcategories in the "politics" category may have a value of 0.75). Multiple tiebreakers may be available and the user may choose which tiebreaker to use.

Subcategories may also add to the overall match score. For example, each subcategory may be given a value of 1/X, with X being the number of overall categories used by the social network application 108. The subcategory values or scores may then be added to the overall match score of the user. Therefore, in an example in which there are a total of 12 categories and user Z shares common interests in 3 equally-weighted categories and 3 equally-weighted subcategories with user X, user Z's match score with user X may be 3.25 consistent with the following equation.

$$3.0(3 \text{ main category matches}) + 3/12(3 \text{ subcategory matches} = 1/12 + 1/12 + 1/12 = 3/12) = 3.25$$

Figure 3:
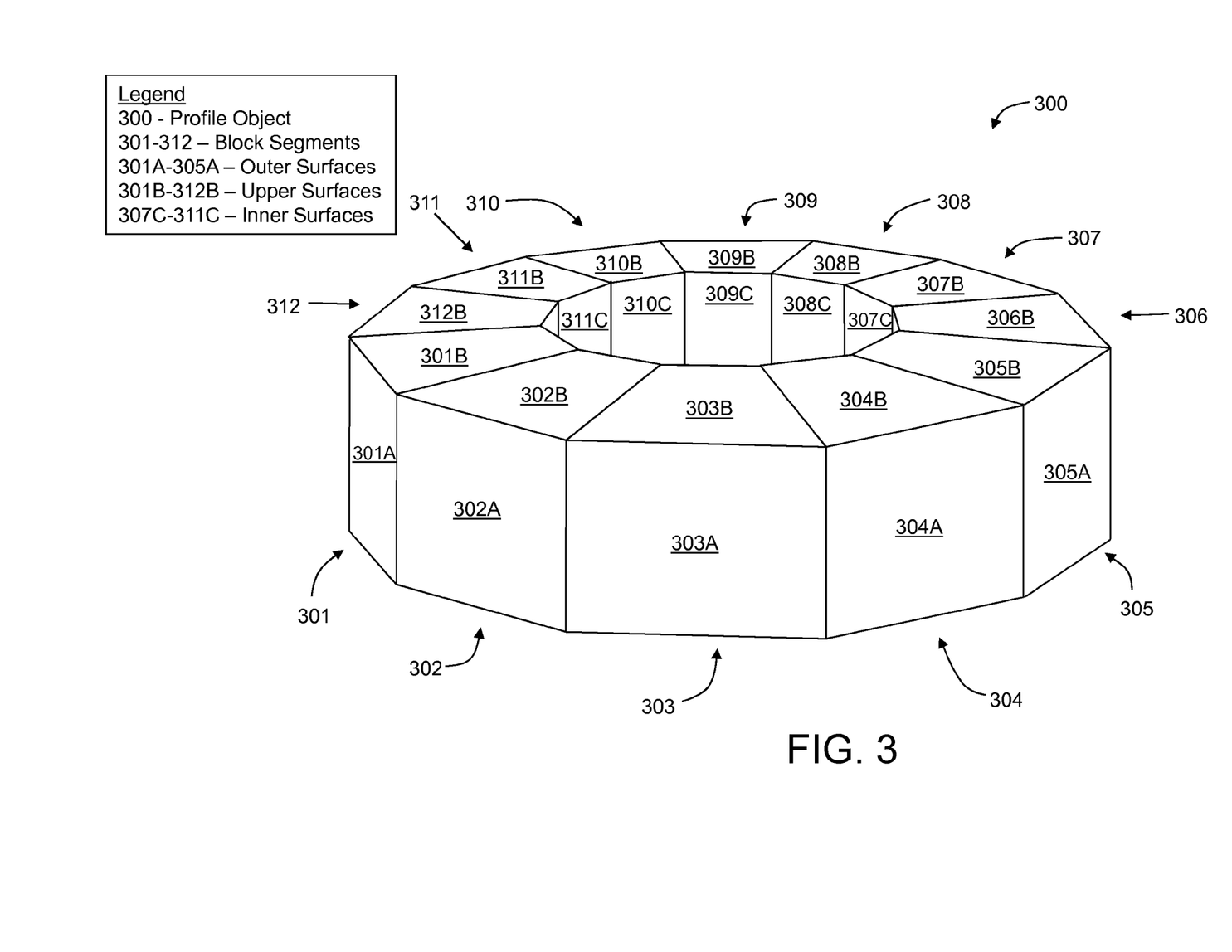
FIG. 3 is an example of a profile object graphically representing the evolution, past, or history of a user over time with respect to various categories.

FIG. 3 is an example of a profile object 300 graphically representing the evolution, past, or history of a user over time with respect to various categories, arranged in accordance with at least some embodiments described herein. As illustrated, the profile object 300 is a three-dimensional object made up of N block segments 301-312. In particular, the profile object 300 is a dodecagon-based cylinder with 12 block segments 301-312.

Each of the block segments 301-312 may correspond to a different category. Continuing with the example above, for instance, the block segment 301 may correspond to food, the block segment 302 may correspond to health, the block segment 303 may correspond to family life, the block segment 304 may correspond to social life/friends, the block segment 305 may correspond to outlook, the block segment 306 may correspond to finances, the block segment 307 may correspond to sports, the block segment 308 may correspond to global events and trends, the block segment 309 may correspond to politics, the block segment 310 may correspond to education, the block segment 311 may correspond to entertainment, and the block segment 312 may correspond to work/aspirations.

Each of the block segments 301-312 includes at least one exposed surface making up an exterior of the profile object 300. For example, each of the block segments 301-305 includes an outer surface 301A-305A. The block segments 306-312 similarly include outer surfaces (not labeled/visible). The outer surfaces 301A-305A of the block segments 301-305 and the outer surfaces of the block segments 306-312 collectively make up an outer surface of the profile object 300. As another example, each of the block segments 301-312 includes an upper surface 301B-312B. The upper surfaces 301B-312B collectively make up an upper surface of the profile object 300. Although not shown, each of the block segments 301-312 may include a lower surface opposite the corresponding upper surface 301B-312B and the lower surfaces of the block segments 301-312 may collectively make up a lower surface of the profile object 300. As another example, each of the block segments 307-311 includes an inner surface 307C-311C and the other segments 301-306 and 312 may similarly include inner surfaces (not labeled/visible). The inner surfaces 307C-311C of the block segments 307-311 and the inner surfaces of the other block segments 301-306 and 312 collectively make up an inner surface of the profile object 300.

As previously mentioned, the indicators associated with different age ranges of a user and each of the categories may be included somewhere on the corresponding block segment 301-312 of the profile object 300, e.g., on a corresponding outer surface, upper surface, lower surface, and/or inner surface or other exposed surface. For example, at least one of the exposed surfaces of each of the block segments 301-312 may be divided into multiple areas, where each area corresponds to a different age range and includes an indicator associated with the age range of the area that includes the indicator and associated with the category of the block segment that includes the indicator.

Alternately or additionally, each exposed surface of each of the block segments 301-312 may correspond to a different age range, at least for users that have lived during no more than four age ranges. For example, the outer surface of each of the block segments 301-312 may correspond to a first age range, the upper surfaces may correspond to a second age range, the lower surfaces may correspond to a third age range, and the inner surfaces may correspond to a fourth age range.

Whereas some of the surfaces of the some of the block segments 301-312 are not visible in the view of FIG. 3, embodiments described herein may include providing a UI that allows a user to rotate the profile object 300 and to change the viewing angle, as desired, to thereby allow the user to view surfaces of the block segments 301-312 that are not visible in the view of FIG. 3.

Modifications, additions, or omissions may be made to the profile object 300 of FIG. 3 without departing from the scope of the claimed embodiments. For example, while implemented as a dodecagon-based cylinder with 12 block segments, embodiments described herein more generally include N-agon-based cylinders with N block segments. Examples include quadragon (e.g., square)-based cylinders (or boxes) with 4 block segments, pentagon-based cylinders with 5 block segments, hexagon-based cylinders with 6 block segments, and so on. Other example profile objects are described in more detail below with respect to FIGS. 5A-5C.

FIGS. 4A-4D illustrate various manners of dividing at least one exposed surface of the block segment 303 of FIG. 3 into multiple areas where each area corresponds to a different age range, arranged in accordance with at least some embodiments described herein. While only the block segment 303 is illustrated in each of FIGS. 4A-4D, it is understood that at least one exposed surface of each of the block segments 301-302 and 304-312 may be similarly divided into multiple areas.

Figure 4A:
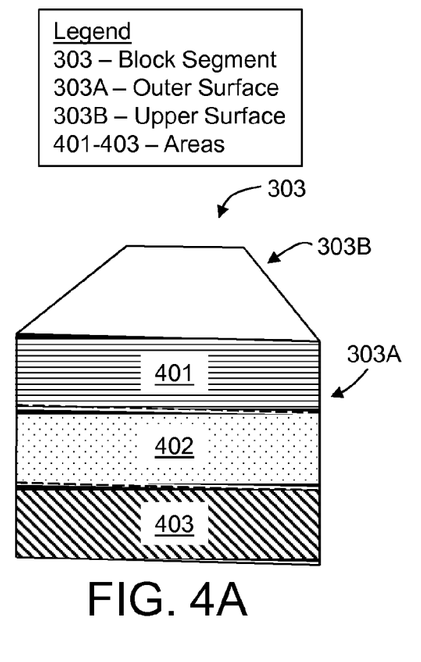
FIGS. 4A-4D illustrate various manners of dividing at least one exposed surface of a block segment included in the profile object of FIG. 3 into multiple areas where each area corresponds to a different age range of the user.

In FIG. 4A, the outer surface 303A of the block segment 303 has been divided into multiple areas 401-403, each corresponding to a different age range. The areas 401-403 are stacked vertically one on top of the next, each generally of the same dimensions as the others. By using vertically stacked areas 401-403, a height of the block segment 303, and thus of the profile object 300, may easily be adjusted up or down to accommodate more or fewer areas corresponding to more or fewer age ranges without making the areas feel cramped.

Figure 4B:
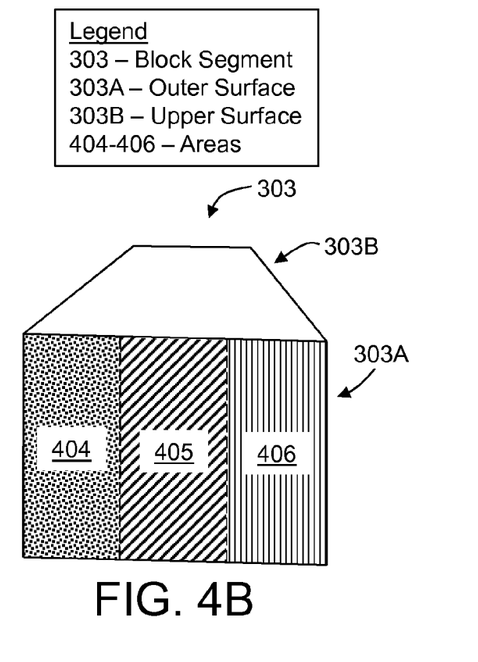

In FIG. 4B, the outer surface 303A of the block segment 303 has been divided into multiple areas 404-406, each corresponding to a different age range. The areas 404-406 are positioned horizontally one next to the other, each generally of the same dimensions as the others.

FIGS. 4A-4B additionally illustrate example indicators that may be provided in the areas 401-406. In particular, the illustrated indicators include fill patterns. For instance, the areas 401, 403, 405, and 406 include different hatch fill patterns while the areas 402 and 404 include different dot fill patterns. Alternately or additionally, the indicators included in each of the areas 401-406 may include different fill patterns than those illustrated and/or may include colors, textures, words, symbols, or other indicators. Each of the indicators may represent a different preference or interest of a user within a given category and during a given age range, as already discussed above.

In some embodiments, information within a particular category and pertaining to at least one age range may be insufficient and/or unavailable to map to an indicator such that an indicator is not generated for that age range and category. In these and other embodiments, the area corresponding to that age range and category may be left blank, may be grayed out, may be blacked out, or may be provided with some other default indicator to indicate that insufficient information within that category has been received with respect to that age range. For instance, continuing with the previous example, if the social network application 108 has not received any information within the category of family life and pertaining to an age range corresponding to the area 401, 402, or 403 in FIG. 4A, or corresponding to the area 404, 405, or 406 in FIG. 4B, the area 401, 402, 403, 404, 405, or 406, as appropriate, may be left blank, may be grayed out, may be blacked out, or may be provided with some other default indicator to indicate that insufficient information within the category of family life has been received with respect to the age range to map to an indicator.

Figure 4C:
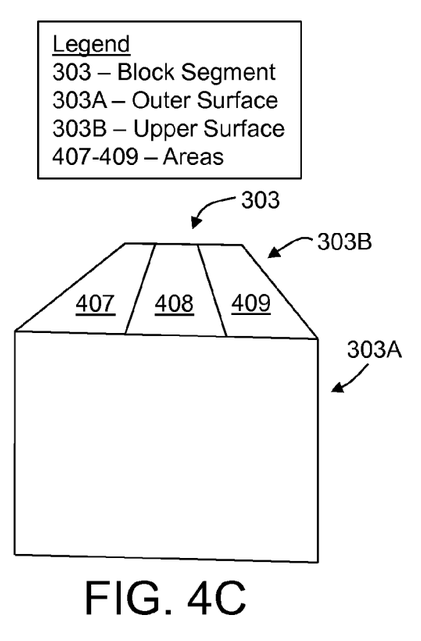
Figure 4D:
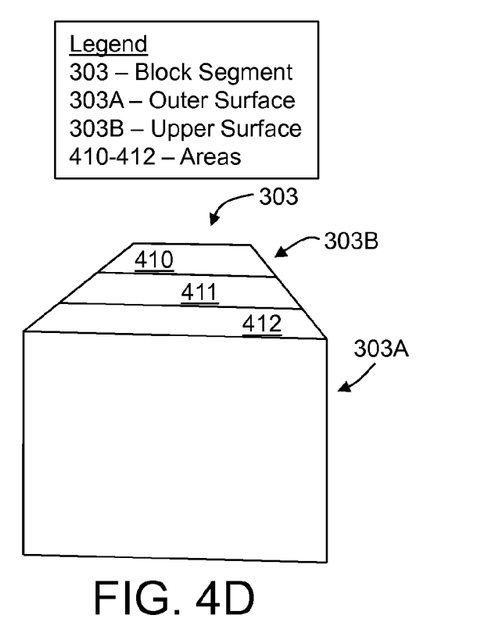

As two additional examples, FIG. 4C illustrates an embodiment in which the upper surface 303B of the block segment 303 has been divided into areas 407-409 corresponding to different age ranges and FIG. 4D illustrates an embodiment in which the upper surface 303B has been divided into areas 410-412 corresponding to different age ranges.

Modifications, additions, or omissions may be made to the embodiments of FIGS. 4A-4D without departing from the scope of the described embodiments. For instance, the inner surface and/or the lower surface of the block segment 303 may be divided into areas corresponding to different age ranges as has already been described for the outer surface 303A and the upper surface 303B. As another example, there may be more or fewer than three areas corresponding to more or fewer than three age ranges depending on the age of the user. Alternately or additionally, the areas into which a given surface is divided may be of different sizes and/or shapes rather than being of the same size and shape as illustrated in FIGS. 4A-4D. Alternately or additionally, the inner surface of the block segment 303 may reflect the same or a similar division of areas as the outer surface 303A and may include the same indicators as provided in the corresponding areas on the outer surface 303A; by configuring all of the block segments 301-312 in a similar manner, even the indicators (or at least some of them) for at least some of the block segments to the rear of the profile object 300, such as block segments 306-312 in FIG. 3, may be visible in the view of FIG. 3 and in similar views.

Figure 5A:
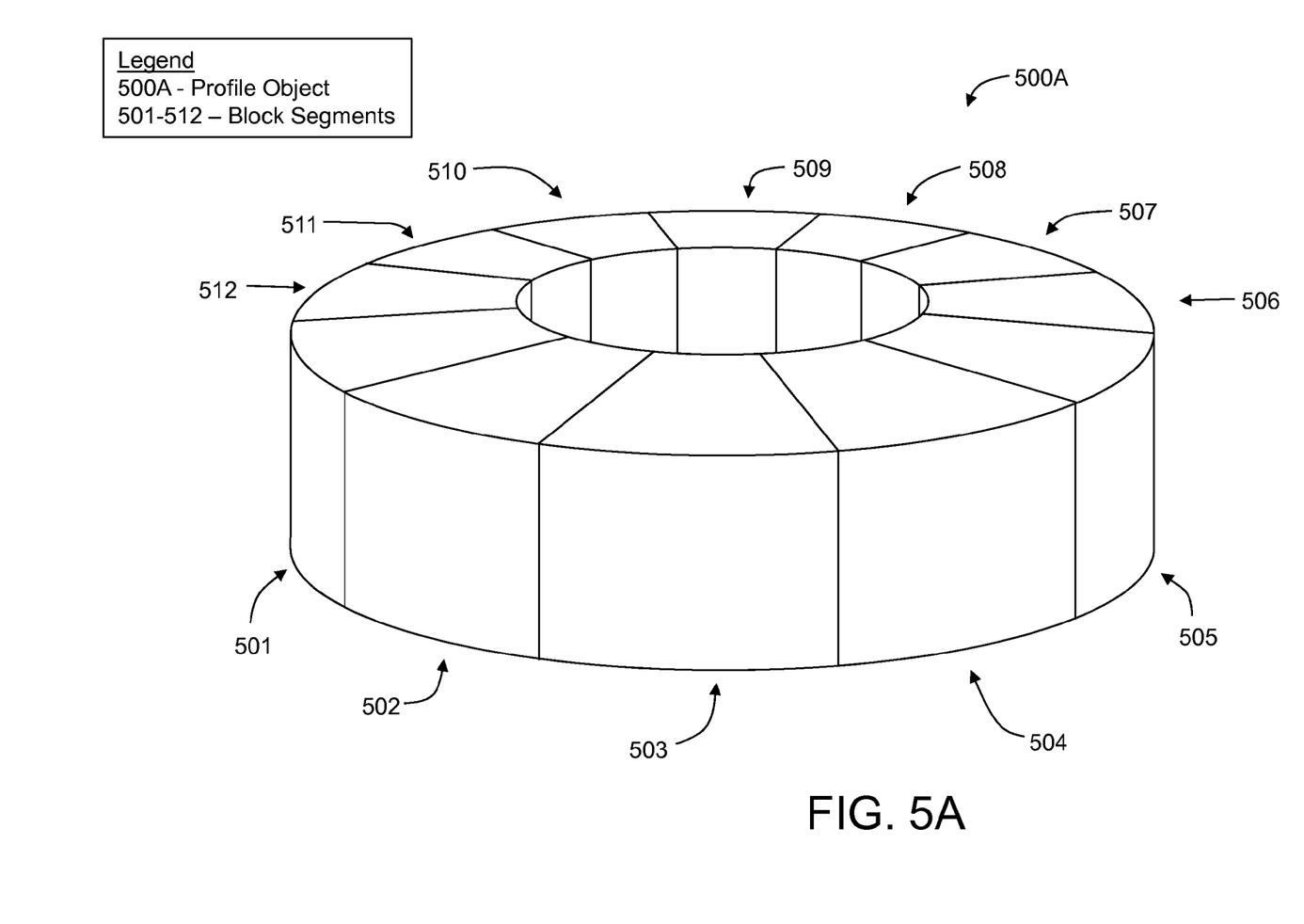
FIGS. 5A-5C illustrate additional examples of profile objects graphically representing the evolution, past, or history of a user over time with respect to various categories.
Figure 5B:
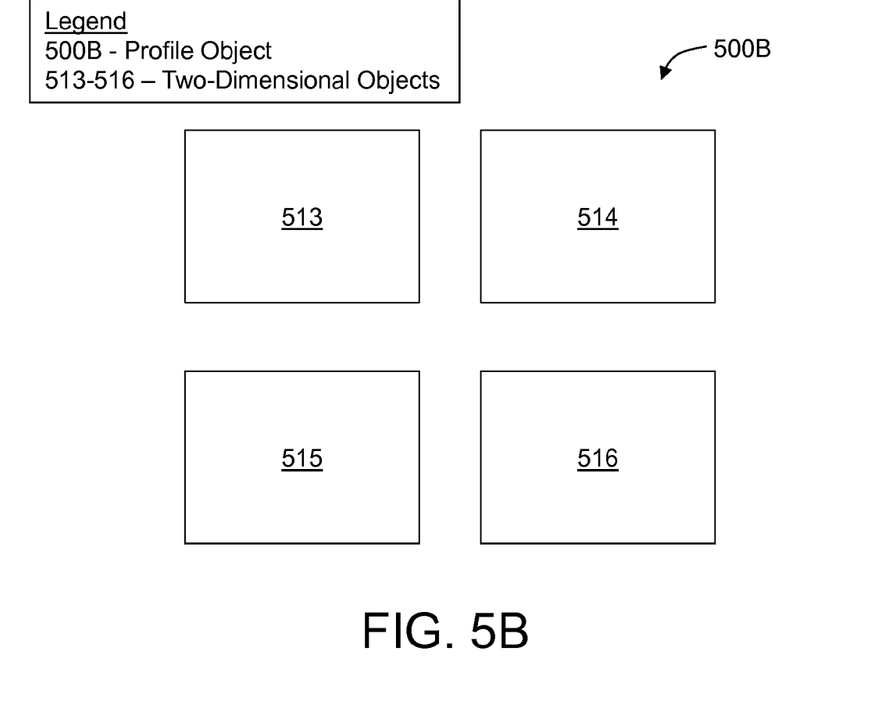
Figure 5C:
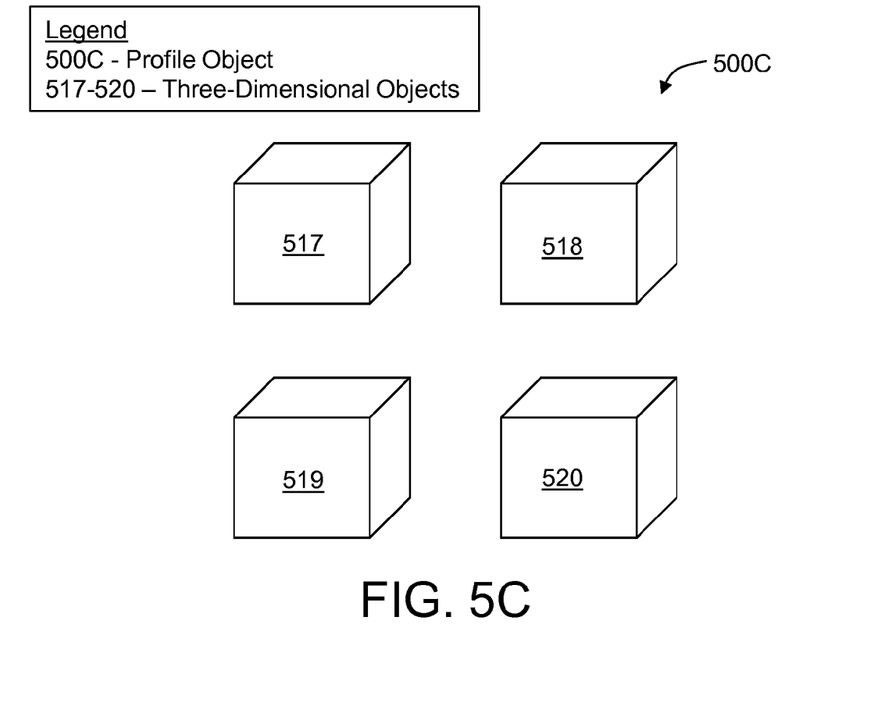

FIGS. 5A-5C illustrate additional examples of profile objects 500A-500C graphically representing the evolution, past, or history of a user over time with respect to various categories, arranged in accordance with at least some embodiments described herein.

In the example of FIG. 5A, the profile object 500A is a three-dimensional object made up of 12 block segments 501-512, similar to the profile object 300 of FIG. 3, each of the 12 block segments 501-512 corresponding to a different one of 12 categories. In contrast to the profile object 300 of FIG. 3, however, the profile object 500A is a regular cylinder. While illustrated as being divided into 12 block segments 501-512, the profile object 500A can instead be divided into more or fewer than 12 block segments 501-512 corresponding to more or fewer than 12 categories.

In addition, although not labeled, each of the block segments 501-512 includes at least one exposed surface making up an exterior of the profile object 500A, e.g., including an outer surface, an upper surface, a lower surface, and an inner surface. At least one of the exposed surfaces of each of the block segments 501-512 may be divided into multiple areas, each corresponding to a different age range, as already described above. Moreover, an indicator may be provided in each of the areas as already described above.

In the example of FIG. 5B, the profile object 500B is an array of two-dimensional objects 513-516. Each of the two-dimensional objects 513-516 is a rectangle as illustrated, but may alternately include any other desired two-dimensional object. Each of the two-dimensional objects 513-516 may be divided into multiple areas, each corresponding to a different age range and each of the areas may include an indicator associated with the age range of the area that includes the indicator and associated with the category of the two-dimensional object 513-516 that includes the indicator.

While four two-dimensional objects 513-516 corresponding to four categories are illustrated in FIG. 5B, the profile object 500B may include more or fewer than four two-dimensional objects 513-516 corresponding to more or fewer than four categories. Alternately or additionally, if one or more categories are relatively less important to a user and/or for any other reason, embodiments described herein may allow the user to choose to suppress the display of the corresponding two-dimensional objects 513-516 to simplify the user's profile object 500B so that only some of the two-dimensional objects 513-516 are displayed.

In the example of FIG. 5C, the profile object 500C includes multiple three-dimensional objects 517-520. Each of the three-dimensional objects 517-520 is a cube as illustrated, but may alternately include any other desired three-dimensional object with multiple surfaces. Each surface of each of the three-dimensional objects 517-520 may correspond to a different age range. For example, a front surface of each of the three-dimensional objects 517-520 may correspond to a first age range, a top surface of each of the three-dimensional objects 517-520 may correspond to a second age range, and so on. Each surface of each of the three-dimensional objects 517-520 may include an indicator associated with the age range of the surface that includes the indicator and associated with the category of the three-dimensional object 517-520 that includes the indicator.

While four three-dimensional objects 517-520 corresponding to four categories are illustrated in FIG. 5C, the profile object 500C may include more or fewer than four three-dimensional objects 517-520 corresponding to more or fewer than four categories. Alternately or additionally, if one or more categories are relatively less important to a user and/or for any other reason, embodiments described herein may allow the user to choose to suppress the display of the corresponding three-dimensional objects 517-520 to simplify the user's profile object 500C so that only some of the three-dimensional objects 517-520 are displayed.

An example embodiment will now be described in which there are twelve categories including food, health, family life, social life/friends, outlook, finances, sports, global events and trends, politics, education, entertainment, and work/aspirations. In this example, a dodecagon-based cylinder-type profile object as in FIG. 3 is generated for a user after the user fills out a questionnaire where each category corresponds to a different one of the block segments 301-312 of the profile object 300. Suppose the user is 27 years old such that the user has lived (at least partially) through a first age range from 8-12, a second age range from 13-19, and a third age range from 20-29. Thus, the outer surface or upper surface of each of the block segments 301-312 may be divided into three areas, e.g., as illustrated in FIGS. 4A-4D. A color or other indicator included in each of the areas for each of the block segments 301-312 may be determined by the user's interests and preferences within the corresponding category and pertaining to the corresponding age range.

As an example, and in the category of sports, if the user preferred soccer when he was 9 (or more generally, from 8-12), the user may be assigned the color blue (or other indicator) for the block segment 307 corresponding to sports for age range 8-12 and the color blue may be included in an area corresponding to the 8-12 age range on one of the surfaces of the block segment 307. If the user preferred cricket when the user was 15 (or more generally, from 13-19), the user may be assigned the color red (or other indicator) for the block segment 307 for age range 13-19 and the color red may be included in an area corresponding to the 13-19 age range on one of the surfaces of the block segment 307. If the user preferred American football when the user was 21 (or more generally, from 20-29), the user may be assigned the color green (or other indicator) for the block segment 307 for age range 20-29.

Embodiments described herein allow matching of users based on matching histories as graphically represented by profile objects of the users to allow users to connect with each other based on a similar history, at least with respect to one category. In some embodiments, a user may identify one or more categories as being relatively more important than other categories such that matching the identified category has a greater weight than matching other categories.

Consider the following example. Two different users, both aged 27, with very few current or apparent common interests, fill out the questionnaire, which reveals the following information. Both users had been fond of the same sports team during their childhood and based many of their childhood activities and days off watching the sports team play. Each also felt neglected by friends in school, which caused great social anxiety and issues, and each was significantly impacted by the Vietnam War because each had a father serve in the Vietnam War. Each also grew up during the Cold War era, where hatred of the Soviets in the United States seemed widespread to each. In addition to the Cold War, each feels that global competition was another important global event that shaped their childhood. The two users both feel that their teenage years were most important in shaping their characters. They both also feel that, personally, the family category and the sports category are the most important of all of the categories covered by the questionnaire and played the biggest role in molding their personalities. Thus, they identify the age range from 13-19 and the categories of family life and sports as being most important. For instance, embodiments described herein may allow the users to place a dot or other marking on the profile object, and more particularly, on the block segment corresponding to sports and on the block segment corresponding to family life in the corresponding area for the 13-19 age range to identify these categories/age range as being relatively more important to the users. Alternately or additionally, the relative importance may be identified in some other manner. In the foregoing example, although the two users do not seem to have any current or apparent common interests, it is apparent in view of the disclosure that, at least with respect to some categories, the two users do have quite a bit in common and may thus be able to interact and connect based on their past experiences.

Embodiments described herein allow the users to do so by, e.g., collecting the information, mapping the information to indicators, and generating profile objects that can be searched and/or matched against. For instance, the profile object generated for each of these users may have multiple block segments (as in FIGS. 3 and 5A), two-dimensional objects (as in FIG. 5B) and/or three-dimensional objects (as in FIG. 5C) corresponding to categories of importance to the user with multiple areas corresponding to age ranges of the users, where the categories and/or age ranges have common indicators between the profile objects for the two users. Thus, upon searching for people who have similar indicators in the age ranges and/or categories that the users deems important, indicating a past with common trends and interests in these categories, these two users may encounter each other. Upon seeing that their profile objects share common colors during one or more age ranges, the users can judge that they may have had a similar past with respect to at least one category and/or age range. Embodiments described herein may then allow either or both of the users to click on the profile shape of the other, which may call up a biography of the user associated with the profile shape, the biography including the user's past and/or a brief summary of their answers to some or all of the questions in the questionnaire, the openness of which each user could configure for him or herself.

Each user may be allowed to choose what parts (e.g., which categories and/or age ranges) of their past were most important or influential for them in determining their personality in the present. For example, each user may choose to focus on a particular age range of his or her life or on a certain category or categories.

According to some embodiments described herein, privacy may be relatively less important when finding a potential match. Some users may be willing to trade a bit of privacy to get a better understanding of the potential match with other users. Alternately or additionally, privacy may be at least partially controlled by the mapping of user information to the indicators that are used to graphically represent users' evolution, past, or history where the meaning of each of the indicators is not generally known by users.

Figure 6:
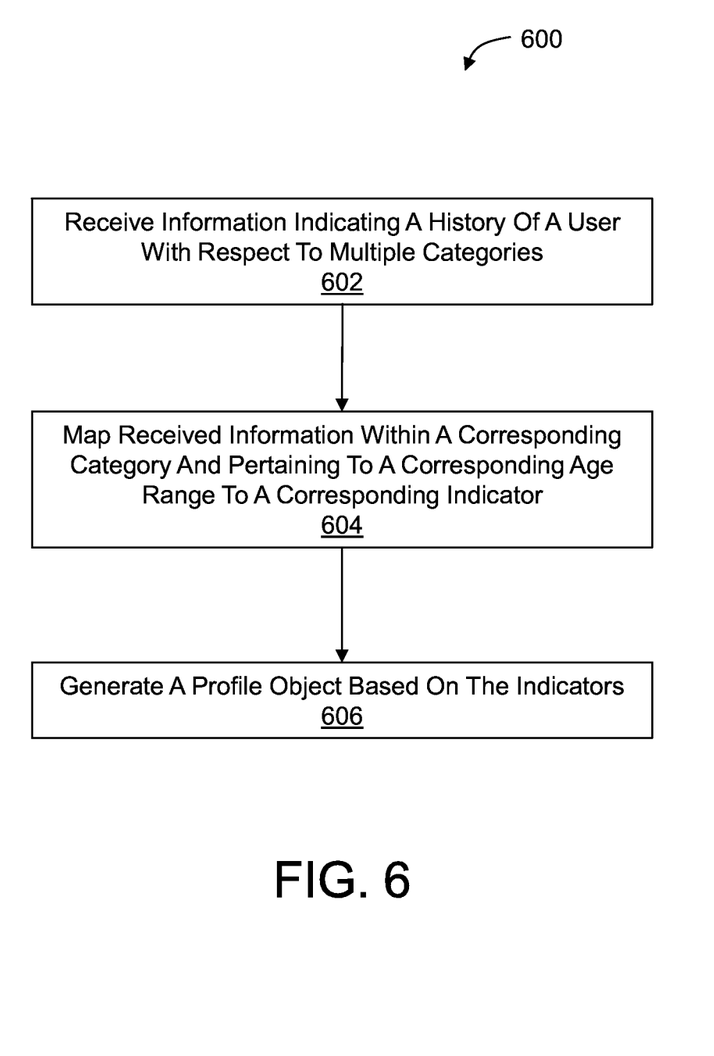
FIG. 6 is a flow chart of an example method of graphically representing a history of a user.

FIG. 6 is a flow chart of an example method 600 of graphically representing a history of a user, arranged in accordance with at least some embodiments described herein. The method 600 in some embodiments is performed by the social network application 108, or more particularly by one or more computing devices, such as the server 104 and/or the client device 106, executing the social network application 108. Although illustrated as discrete blocks, various blocks may be divided into additional blocks, combined into fewer blocks, or eliminated, depending on the desired implementation.

The method 600 may begin at block 602 in which information is received indicating a history of a user with respect to a plurality of categories. The received information may include information representing, during each of the age ranges, preferences of the user within at least one of the categories, interests of the user within at least one of the categories, and/or or influential events within at least one of the categories. The information may be received in the form of user responses to questions included in a questionnaire, for example.

At block 604, the method 600 may include mapping received information within a corresponding category and pertaining to a corresponding age range to a corresponding indicator such that the received information is mapped to multiple indicators. Each indicator may be associated with a corresponding category and a corresponding age range. Any mapping algorithm can be implemented without limitation.

At block 606, the method 600 may include generating a profile object based on the indicators. The profile object may graphically represent the history of the user with respect to the categories. FIGS. 3 and 5A-5C illustrate example profile objects, as already discussed above.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the user may be a first user and the method may further include receiving a search request from the first user. In response to the search request, multiple profile objects associated with different users may be searched. Based on the search, a second user having a similar history as the first user with respect to at least one of the categories may be identified. In these and other embodiments, the search request received from the first user may identify a particular category as having a greater importance to the first user than other categories. Identifying the second user as having a similar history as the first user with respect to at least one of the categories may include determining that at least one indicator of the second user that is associated with an age range and the particular category matches at least one indicator of the first user that is associated with the same age range and the particular category.

Some embodiments described herein include an article of manufacture such as a non-transitory computer-readable medium having computer instructions stored thereon that are executable by a computing device to perform one or more of the operations included in the method 600 of FIG. 6, such as the operations illustrated by blocks 602, 604, and 606, and/or variations thereof. The non-transitory computer-readable medium and the computing device may be included in the server 104 and/or the client device 106 of FIG. 1, for example.

Figure 7:
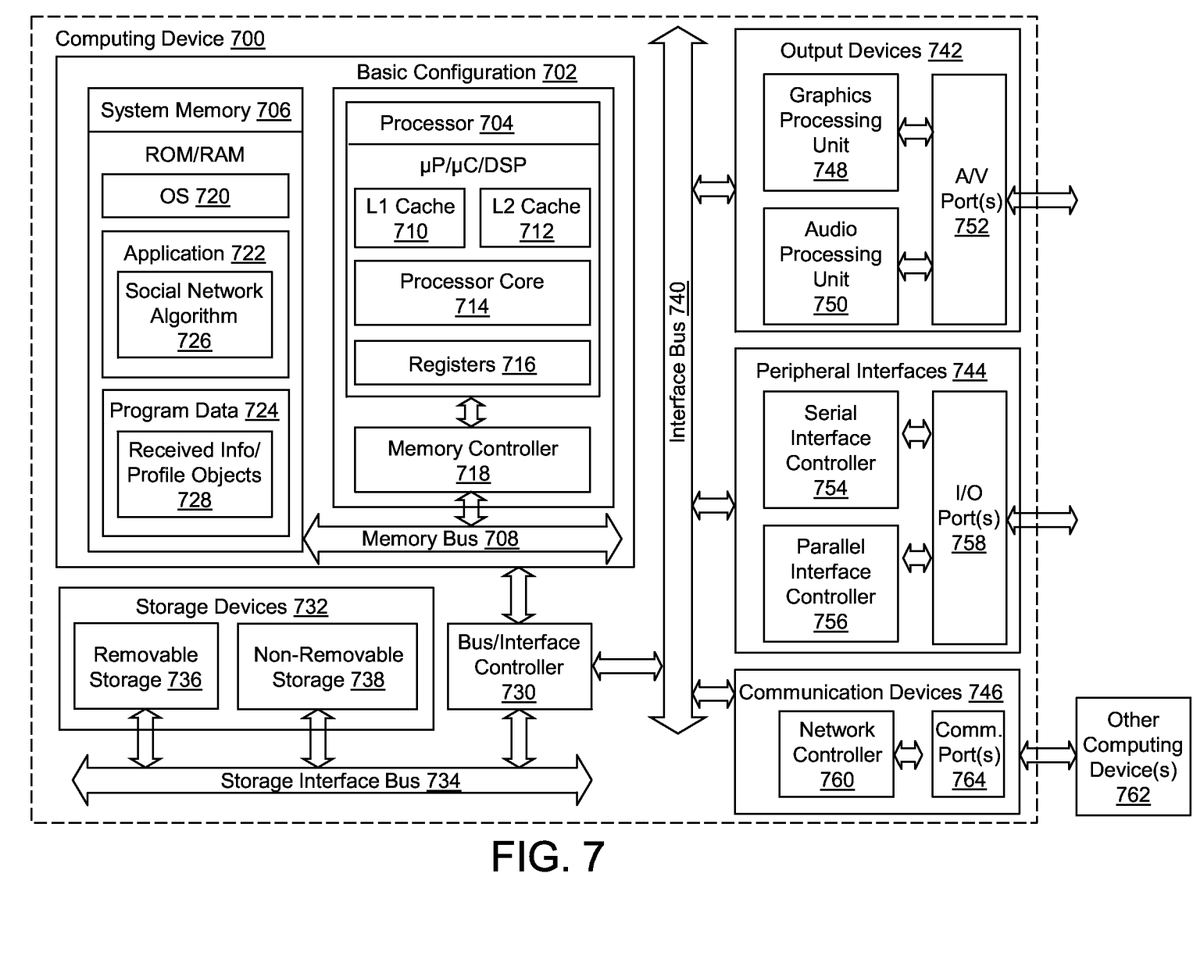
FIG. 7 is a block diagram illustrating an example computing device that is arranged for graphically representing a history of a user and searching for users with common or shared histories.

FIG. 7 is a block diagram illustrating an example computing device 700 that is arranged for graphically representing a history of a user and searching for users with common or shared histories, in accordance with at least one embodiment described herein. The computing device 700 may be included in or correspond to the server 104 and/or the client device 106 of FIG. 1, for example. In a basic configuration 702, the computing device 700 typically includes one or more processors 704 and a system memory 706. A memory bus 708 may be used for communicating between the processor 704 and the system memory 706.

Depending on the desired configuration, the processor 704 may be of any type including, but not limited to, a microprocessor (UP), a controller, a microcontroller (UC), a central processing unit (CPU), a digital signal processor (DSP), any combination thereof, or other suitable processing device. The processor 704 may include one or more levels of caching, such as a level one cache 710 and a level two cache 712, a processor core 714, and registers 716. An example processor core 714 may include an arithmetic logic unit (ALU), a floating point unit (FPU), a DSP core, or any combination thereof. An example memory controller 718 may also be used with the processor 704, or in some implementations the memory controller 718 may be an internal part of the processor 704.

Depending on the desired configuration, the system memory 706 may be of any type including, but not limited to, volatile memory (such as RAM), non-volatile memory (such as ROM, flash memory, etc.), or any combination thereof. The system memory 706 may include an OS 720, one or more applications 722, and program data 724. The application 722 may include a social network algorithm 726 that is arranged to perform one or more of the operations or functions as described herein, including the operations 602, 604, and/or 606 of the method 600 of FIG. 6. Accordingly, the application 722 may be or correspond to the social network application 108 described herein. The program data 724 may include received information/profile objects 728, including information received from a user, e.g., in response to a questionnaire, a profile object of the user, and/or profile objects of other users. In some embodiments, the application 722 may be arranged to operate with the program data 724 on the OS 720 such that implementations of the method 600 of FIG. 6 may be provided as described herein.

The computing device 700 may have additional features or functionality, and additional interfaces to facilitate communications between the basic configuration 702 and other devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer-readable instructions, data structures, program modules, or other data.

The system memory 706, removable storage devices 736 and non-removable storage devices 738 are examples of non-transitory computer-readable media. Non-transitory computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which may be used to store the desired information and which may be accessed by the computing device 700. Any such non-transitory computer-readable media may be part of the computing device 700.

The computing device 700 may also include an interface bus 740 for facilitating communication from various interface devices (e.g., output devices 742, peripheral interfaces 744, and communication devices 746) to the basic configuration 702 via the bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 700 may be implemented as a portion of a small-form factor portable (or mobile) electronic device such as a cell phone, a personal data assistant (PDA), a personal media player device, a wireless web-watch device, a personal headset device, an application-specific device, or a hybrid device that includes any of the above functions. The computing device 700 may also be implemented as a personal computer, including both laptop computer and non-laptop computer configurations.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:
1. A method of graphically representing a history of a user, the method comprising:
    receiving information indicating a history of a user across a plurality of age ranges of the user with respect to a plurality of categories, at least one category of which is influential in determining a personality of the user;
    mapping received information within a corresponding category of the plurality of categories and pertaining to a corresponding age range of the plurality of age ranges of the user to a corresponding indicator such that the received information is mapped to a plurality of indicators, each indicator being associated with a corresponding category and a corresponding age range;
    generating a profile object based on the plurality of indicators, the profile object graphically representing the history of the user across the plurality of age ranges of the user with respect to the plurality of categories, and making the profile object visible as part of a profile of the user in a social network.

2. The method of claim 1, wherein the received information indicating the history of the user comprises information representing, during each of the plurality of age ranges, preferences of the user within at least one of the plurality of categories, interests of the user within at least one of the plurality of categories, and influential events within at least one of the plurality of categories.

3. The method of claim 1, wherein:
the profile object comprises a three-dimensional object made up of a plurality of block segments, each of the plurality of block segments corresponding to a different one of the plurality of categories;
each of the plurality of block segments has an exposed surface making up an exterior of the three-dimensional object;
the exposed surface of each of the plurality of block segments is divided into a plurality of areas, each corresponding to a different one of the plurality of age ranges and including an indicator associated with the age range of the area that includes the indicator and associated with the category of the block segment that includes the indicator.

4. The method of claim 3, wherein the three-dimensional object comprises a dodecagon-based cylinder and wherein the plurality of block segments comprises twelve block segments.

5. The method of claim 1, wherein:
the profile object comprises an array of two-dimensional objects;
each of the two-dimensional objects corresponds to a different one of the plurality of categories;
each of the two-dimensional objects is divided into a plurality of areas each corresponding to a different one of the plurality of age ranges; and
each of the plurality of areas includes an indicator associated with the age range of the area that includes the indicator and associated with the category of the two-dimensional object that includes the indicator.

6. The method of claim 1, wherein:
the profile object comprises a plurality of three-dimensional objects;
each of the three-dimensional objects corresponds to a different one of the plurality of categories;
each of the three-dimensional objects has a plurality of surfaces each corresponding to a different one of the plurality of age ranges; and
each of the plurality of surfaces includes an indicator associated with the age range of the surface that includes the indicator and associated with the category of the three-dimensional object that includes the indicator.

7. The method of claim 1, wherein each of the plurality of indicators comprises any combination of a color and a fill pattern.

8. The method of claim 1, wherein the user comprises a first user, the method further comprising:
receiving a search request from the first user;
in response to the search request, searching a plurality of profile objects, each associated with a different one of a plurality of users; and
based on the search, identifying a second user as having a similar history as the first user with respect to at least one of the plurality of categories and in at least one of the plurality of age ranges that is the same for the first user and the second user.

9. The method of claim 8, wherein:
the search request identifies a particular category as having a greater importance to the first user than other categories; and
identifying the second user as having a similar history as the first user with respect to at least one of the plurality of categories comprises determining that at least one indicator of the second user that is associated with an age range and the particular category matches at least one indicator of the first user that is associated with the same age range and the particular category.

10. A non-transitory computer-readable medium having computer instructions stored thereon that are executable by a computing device to perform operations comprising:
receiving information indicating a history of a user across a plurality of age ranges of the user with respect to a plurality of categories, at least one category of which is influential in determining a personality of the user;
mapping received information within a corresponding category of the plurality of categories and pertaining to a corresponding age range of the plurality of age ranges of the user to a corresponding indicator such that the received information is mapped to a plurality of indicators, each indicator being associated with a corresponding category and a corresponding age range;
generating a profile object based on the plurality of indicators, the profile object graphically representing the history of the user across the plurality of age ranges of the user with respect to the plurality of categories; and
making the profile object visible as part of a profile of the user in a social network.

11. The non-transitory computer-readable medium of claim 10, wherein the received information indicating the history of the user comprises information representing, during each of the plurality of age ranges, preferences of the user within at least one of the plurality of categories, interests of the user within at least one of the plurality of categories, and influential events within at least one of the plurality of categories.

12. The non-transitory computer-readable medium of claim 10, wherein:
the profile object comprises a three-dimensional object made up of a plurality of block segments, each of the plurality of block segments corresponding to a different one of the plurality of categories;
each of the plurality of block segments has an exposed surface making up an exterior of the three-dimensional object;
the exposed surface of each of the plurality of block segments is divided into a plurality of areas, each corresponding to a different one of the plurality of age ranges and including an indicator associated with the age range of the area that includes the indicator and associated with the category of the block segment that includes the indicator.

13. The non-transitory computer-readable medium of claim 12, wherein the three-dimensional object comprises a dodecagon-based cylinder and wherein the plurality of block segments comprises twelve block segments.

14. The non-transitory computer-readable medium of claim 10, wherein:
the profile object comprises an array of two-dimensional objects;

each of the two-dimensional objects corresponds to a different one of the plurality of categories;

each of the two-dimensional objects is divided into a plurality of areas each corresponding to a different one of the plurality of age ranges; and each of the plurality of areas includes an indicator associated with the age range of the area that includes the indicator and associated with the category of the two-dimensional object that includes the indicator.

15. The non-transitory computer-readable medium of claim 10, wherein:

the profile object comprises a plurality of three-dimensional objects;

each of the three-dimensional objects corresponds to a different one of the plurality of categories;

each of the three-dimensional objects has a plurality of surfaces each corresponding to a different one of the plurality of age ranges; and each of the plurality of surfaces includes an indicator associated with the age range of the surface that includes the indicator and associated with the category of the three-dimensional object that includes the indicator.

16. The non-transitory computer-readable medium of claim 10, wherein each of the plurality of indicators comprises any combination of a color and a fill pattern.

17. The non-transitory computer-readable medium of claim 10, wherein the user comprises a first user, the operations further comprising:

receiving a search request from the first user;

in response to the search request, searching a plurality of profile objects, each associated with a different one of a plurality of users; and based on the search, identifying a second user as having a similar history as the first user with respect to at least one of the plurality of categories and in at least one of the plurality of age ranges that is the same for the first user and the second user.

18. The non-transitory computer-readable medium of claim 17, wherein:

the search request identifies a particular category as having a greater importance to the first user than other categories; and identifying the second user as having a similar history as the first user with respect to at least one of the plurality of categories comprises determining that at least one indicator of the second user that is associated with an age range and the particular category matches at least one indicator of the first user that is associated with the same age range and the particular category.

19. The method of claim 1, wherein the plurality of categories include at least one of politics, outlook, finances, food, physical health, sports, or global events and trends.

20. A method of graphically representing a history of a first user, the method comprising:

receiving information indicating a history of a first user across a plurality of age ranges of the first user with respect to a plurality of categories, at least one category of which is influential in determining a personality of the first user;

mapping received information within a corresponding category of the plurality of categories and pertaining to a corresponding age range of the plurality of age ranges of the first user to a corresponding indicator such that the received information is mapped to a plurality of indicators, each indicator being associated with a corresponding category and a corresponding age range;

generating a profile object based on the plurality of indicators, the profile object graphically representing the history of the first user across the plurality of age ranges of the first user with respect to the plurality of categories;

making the profile object visible as part of a profile of the first user in a social network;

receiving a search request from the first user;

in response to the search request, searching a plurality of profile objects, each associated with a different one of a plurality of users of the social network; and based on the search, identifying a second user as having a similar history as the first user with respect to at least one of the plurality of categories and in at least one of the plurality of age ranges that is the same for the first user and the second user.

* * * * *